(12) United States Patent
Schmid et al.

(10) Patent No.: US 8,752,302 B2
(45) Date of Patent: Jun. 17, 2014

(54) PROCESSING APPARATUS

(75) Inventors: Johannes Schmid, Starzach/Wachendorf (DE); Axel Petrak, Horb (DE)

(73) Assignee: Homag Holzbearbeitungssysteme GmbH, Schopfloch (DE)

( * ) Notice: Subject to any disclaimer, the term of this patent is extended or adjusted under 35 U.S.C. 154(b) by 225 days.

(21) Appl. No.: 13/347,906

(22) Filed: Jan. 11, 2012

(65) Prior Publication Data

US 2012/0180328 A1 Jul. 19, 2012

(30) Foreign Application Priority Data

Jan. 14, 2011 (DE) .................... 10 2011 002 696

(51) Int. Cl.
*B23K 26/14* (2014.01)
*B23K 26/00* (2014.01)
*G01B 11/00* (2006.01)

(52) U.S. Cl.
USPC ............................................. 33/263; 33/286

(58) Field of Classification Search
USPC ................................................... 33/263, 286
See application file for complete search history.

(56) References Cited

U.S. PATENT DOCUMENTS

| | | | | |
|---|---|---|---|---|
| 2,486,503 A | * | 11/1949 | Stephens | 362/362 |
| 3,267,794 A | * | 8/1966 | Howe | 356/153 |
| 4,438,567 A | * | 3/1984 | Raiha | 33/286 |
| 4,698,480 A | | 10/1987 | Klingel | |
| 4,791,715 A | * | 12/1988 | Lovelace | 29/464 |
| 5,160,824 A | | 11/1992 | Bable | |
| 5,376,061 A | | 12/1994 | Suzuki | |
| 6,453,569 B1 | * | 9/2002 | Kumagai et al. | 33/281 |
| 6,593,541 B1 | | 7/2003 | Herren | |
| 6,823,599 B1 | * | 11/2004 | Minarik et al. | 33/286 |
| 6,857,193 B2 | * | 2/2005 | Kallesen et al. | 33/286 |
| 6,892,464 B2 | * | 5/2005 | Ohtomo et al. | 33/290 |
| 7,257,879 B1 | | 8/2007 | Jancso | |
| 7,487,596 B2 | * | 2/2009 | Nash | 33/290 |
| 7,992,312 B2 | * | 8/2011 | Krasko | 33/286 |
| 2005/0133486 A1 | | 6/2005 | Baker et al. | |
| 2010/0195697 A1 | * | 8/2010 | Hollander et al. | 374/121 |

FOREIGN PATENT DOCUMENTS

| | | |
|---|---|---|
| DE | 4040554 A1 | 7/1992 |
| DE | 4113633 A1 | 10/1992 |
| DE | 102006003682 A1 | 7/2007 |
| DE | 102009008284 A1 | 8/2010 |

OTHER PUBLICATIONS

Parallel EP Search Report dated May 10, 2012.
Parallel German application search report dated Jul. 14, 2011.

* cited by examiner

*Primary Examiner* — Christopher Fulton
(74) *Attorney, Agent, or Firm* — Harness, Dickey & Pierce, PLC

(57) ABSTRACT

An apparatus for processing, in particular coating, workpieces which preferably consist at least in certain portions of wood, wood-based materials, plastic or the like, having a radiation device for generating and/or transmitting radiation, preferably a laser beam, and a spindle unit with a shaft (4) rotatable in a shaft bearing section (4*a*) and a holder (5) for accommodating processing tools and/or processing units, characterized in that the shaft (4) and/or a unit (10) attached to the shaft has at least in certain portions a cavity (4*b*, 9*a*, 2*b*) and the radiation device is arranged in such a manner that the radiation runs at least in certain portions inside the cavity.

15 Claims, 4 Drawing Sheets

PROCESSING APPARATUS

TECHNICAL FIELD

The present invention relates to a processing apparatus for processing, and in particular coating, workpieces which preferably consist at least in certain portions of wood, wood-based materials, plastic, or the like. Generic processing apparatuses are used, for example, for processing workpieces which are constructed at least in certain portions of wood, wood-based materials, plastics, metals (such as metal fittings) or a combination thereof, e.g. in the furniture and construction element industry.

PRIOR ART

Radiation, particularly laser radiation, is increasingly used in various production processes, e.g. cutting, joining or inscribing. In this case, the heat generated by the radiation is used specifically to perform corresponding work steps.

It is, however, always problematic to integrate a beam guide in a known processing machine and thus to enlarge the range of uses of such a processing machine by a further type of processing. Considerations regarding the integration of a beam guide in a known processing machine often lead to drawbacks such as additional design effort for adapting a processing apparatus to different production tasks. This results in increased costs.

PRESENTATION OF THE INVENTION

The object of the present invention is to provide a processing apparatus having a beam guidance device in which the beam guidance device is integrated in the machine in the best way possible without affecting the machine's functionality.

This object is achieved by an apparatus for processing, and in particular coating, workpieces which preferably consist at least in certain portions of wood, wood-based materials, plastic, or the like. Advantageous embodiments may be inferred from the subclaims.

The invention is based on the idea of providing a beam guidance device inside a processing machine in such a manner that this does not necessitate any significant modifications or new constructions. Accordingly, the intention is to provide an introduction of energy via an interface in a processing machine with which conventional processing, e.g. shape cutting, can be carried out, wherein transmission of the energy, in particular the radiation energy, runs inside the apparatus, at least in certain portions through a cavity of a shaft and/or a cavity inside a unit attached to the shaft.

It should be pointed out in connection with this that the term "radiation" is to be interpreted in a broad manner within the meaning of this application. Laser radiation is merely mentioned by way of example in this application. However, microwave radiation, UV radiation, infra-red radiation, thermal radiation, etc. are also included. Therefore, "radiation" is to be understood within the meaning of this application as energy transmission from a generator source to a processing zone.

Thus, an apparatus is provided according to the invention having: a radiation device for generating and/or transmitting radiation, preferably a laser beam, and a spindle unit with a shaft rotatable in a shaft bearing section and a holder for accommodating processing tools and/or processing units.

The novel apparatus is characterised in that the shaft and/or the shaft bearing section has at least in certain portions a cavity and that the radiation device is arranged in such a manner that the radiation at least in certain portions runs inside the cavity.

In a preferred embodiment, the cavity which runs at least in certain portions within the shaft and/or the shaft bearing section exits in the region of the holder for accommodating processing tools and/or processing units or in a unit connected to the shaft. The latter may be configured, for example, as a chuck. If the radiation is thus guided through the cavity, then the radiation ultimately arrives at said exit region and can be transmitted from there into a specific processing unit such as a gluing unit.

Moreover, it is provided in one embodiment that the cavity extends through the whole shaft in the shaft's axial direction. Thus the shaft itself can be used a conducting section for the radiation. It may further be provided that the cavity extends through a chucking tool running through the shaft. Such a chucking tool may, for example, be a pull rod with which a chuck, for example, may be attached removably to the shaft. In this way, transmission of the radiation inside the apparatus according to the invention is integrated particularly favourably.

It may further be provided that the spindle unit can be traversed in at least one, preferably in three different directions. The spindle unit may alternatively or additionally be pivotable about at least one axis. Configuration of the spindle unit as a 5-axis unit (at least three translational and 2 rotational axes) is especially preferable.

The radiation unit may also be directly or indirectly joined to the spindle unit or may even be traversable with it. If the radiation unit is connected indirectly to the spindle unit, it may be provided that the radiation unit serves a plurality of apparatuses with radiation.

It is also possible to conceive of different variants with which a processing unit, preferably a gluing unit, connected to the shaft is rotatable. In one variant, rotation of the processing unit and thus of the emerging laser beam can be achieved by rotating the shaft and the processing unit attached to it. In another variant, the processing unit is rotatably supported relative to the shaft. In a further variant, a chuck attached between the shaft and the processing unit can be rotated instead of the shaft.

In a special embodiment, the processing unit is configured as what is known as a fixing unit. This can be used to apply a coating material to a workpiece. The radiation supplied via the apparatus according to the invention is used in this case to activate, preferably to heat, the workpiece and/or the coating material (possibly making use of an interaction between workpiece and coating) so that the coating material can be applied subsequently to the workpiece.

In a further embodiment, the processing unit can either be inserted into the holder of the shaft or into the unit (chuck) connected to the shaft and can be removed therefrom. As a result, the apparatus according to the invention is particularly flexible because different types of processing units can be inserted, whereby the radiation supplied to the apparatus can be used partly for processing.

PREFERRED EMBODIMENTS OF THE PRESENT INVENTION

Preferred embodiments of the present invention will be described in detail in the following with reference to the associated drawings.

Embodiment 1

Figure 1:
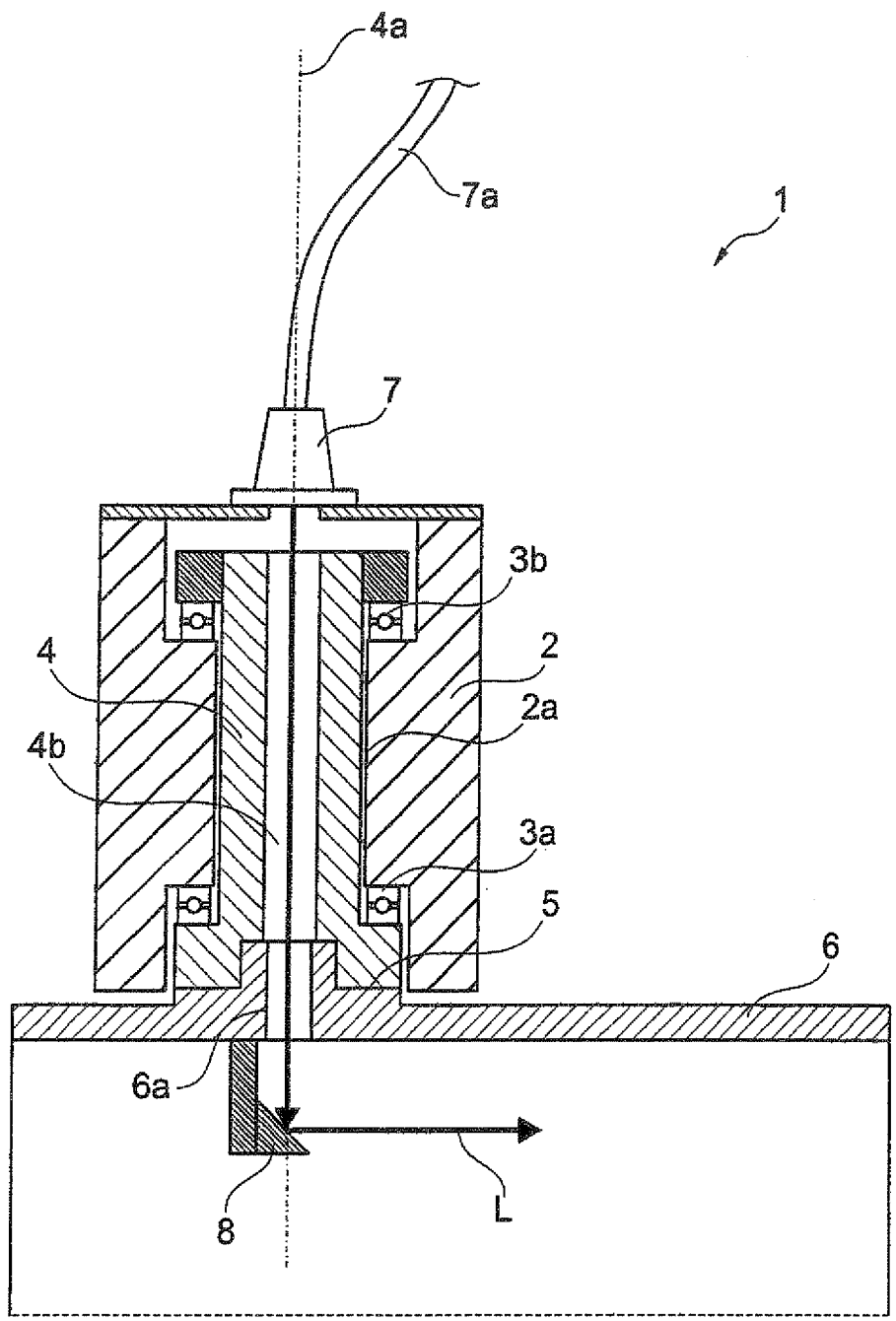
FIG. 1 shows a sectional view of a first preferred embodiment of the present invention.

FIG. 1 shows a first embodiment of the present invention in a lateral view. As can be seen from FIG. 1, a shaft bearing section 2 is provided inside processing apparatus 1 (not illustrated in detail). A cavity 2a in which a shaft 4 is accommodated is provided inside shaft bearing section 2. Shaft 4 is rotatably supported via bearings 3a, 3b in relation to shaft bearing section 2 and can be driven rotationally via a drive unit which is not illustrated.

In an end section of shaft 4, which is exposed if no unit is attached to the shaft, there is a connecting section 5 to which various processing units can be attached. In the present example, a gluing unit 6 is directly attached to connection section 5 of shaft 4.

A cavity 4b extending along the longitudinal axis 4a of shaft 4 is provided inside shaft 4. A corresponding cavity also extending in the longitudinal direction of shaft 4 is formed on gluing unit 6 in such a way that cavities 4b and 6a connect to each other in a region about the longitudinal axis of the shaft.

Attached on shaft bearing section 2 at the end of shaft 4 which opposes connecting section 5 is a collimator 7 which is joined via a fibre-optic cable 7a to a beam generating device that is not illustrated, in this case a laser. Alternatively, the beam generating device may also be attached directly to shaft bearing section 2 or to processing apparatus 1.

In the present example, collimator 7 causes a laser beam L supplied via fibre-optic cable 7a to be launched into cavity 4b of shaft 4, said beam then continuing along longitudinal axis 4a of shaft 4 within cavity 4b and entering gluing unit 6 via cavity 6a provided on gluing unit 6. Provided inside the gluing unit is an optic 8, in particular a mirror and/or a prism, in order to deflect launched laser beam L into gluing unit 6. The various types of processing which can be carried out with the laser beam thus launched will be explained later. At this point it should be mentioned that further mirrors may be provided inside the gluing unit so that laser beam L is deflected to the processing zone.

In this case, embodiment 1 according to FIG. 1 particularly has the advantage that only one cavity 4b has to be provided in shaft 4 in addition to the provision of an interface for launching the laser radiation. The attachment of other processing units (such as a milling tool) is also not affected by the provision of a hollow shaft when there is a changeover of units.

Embodiment 2

Figure 2:
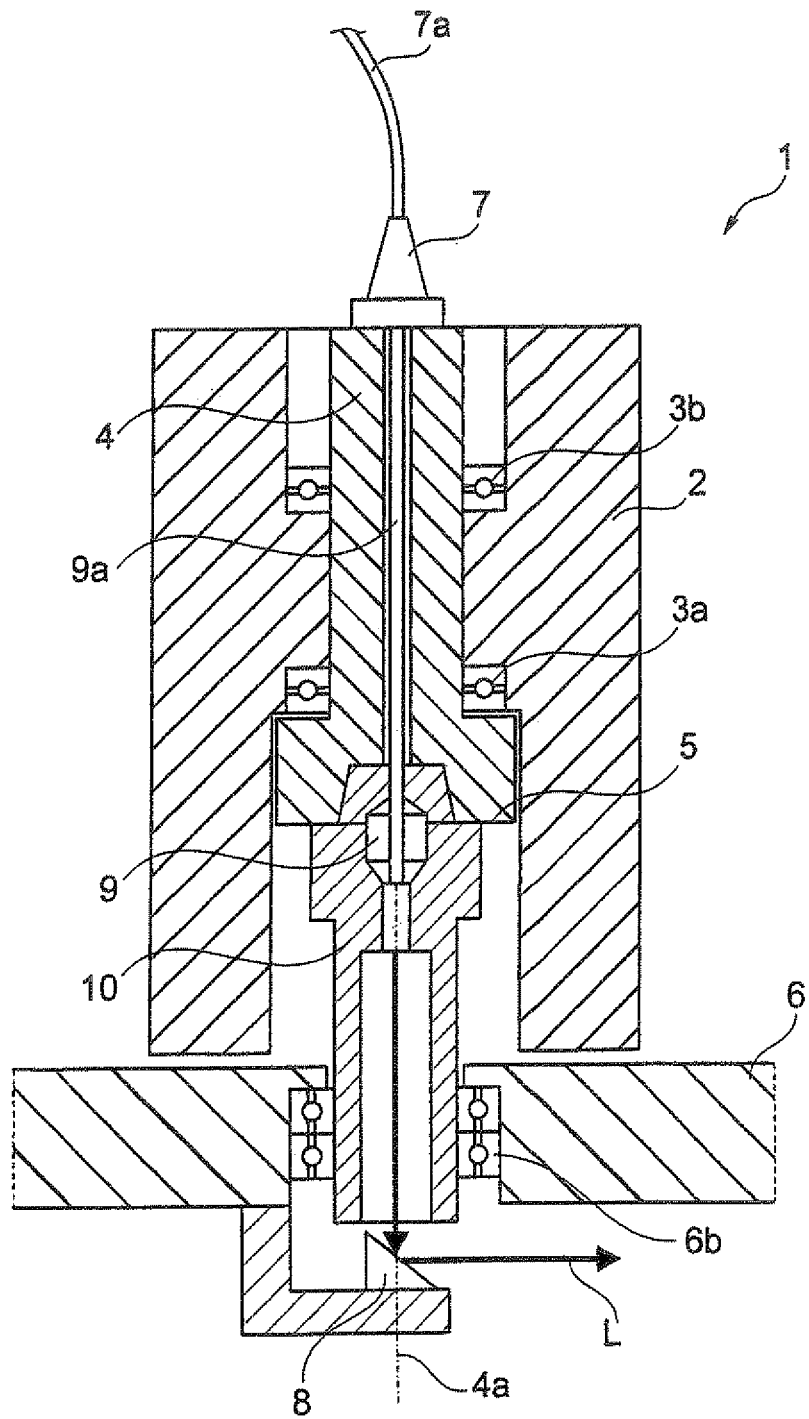
FIG. 2 shows a sectional view of a second preferred embodiment of the present invention.

FIG. 2 illustrates a second embodiment of the present invention. For the sake of greater clarity, identical reference numerals to those shown in the previous first embodiment are used for corresponding components and elements.

The second embodiment of the present invention essentially differs from the first embodiment in that a chuck 10 is attached to shaft 4 by means of a chucking tool (pull rod) 9. A laser beam is conducted along the longitudinal axis of the shaft as in the first embodiment. However, chucking tool 9 is accommodated inside shaft 4. Chucking tool 9, however, has a cavity 9a in the longitudinal direction through which the radiation launched by collimator 7 is routed through shaft 4, and which is routed at the end of chucking tool 9 into chuck 10 from where it is further guided into gluing unit 6[1]. In this case, it is provided according to embodiment 2 of the present invention that gluing unit 6 is rotatably attached to chuck 10 by means of a bearing 6b.

[1] Translator's note: The German sentence is formulated in an unconventional manner; this is what is probably meant.

Thus laser beam L can be guided via shaft 4 and chuck 10 into gluing unit 6 while gluing unit 6 can rotate about chuck 10 during processing.

Alternatively, as in embodiment 1, bearing 6b may also be omitted, as a result of which shaft 4, chuck 10 and gluing unit 6 are joined to each other in a rotationally fixed manner. If rotation of laser beam L is desired in a different direction, shaft 4 is rotated as in embodiment 1.

In a further alternative variant, bearing 6b may also be omitted, as a result of which chuck 10 and gluing unit 6 are joined to each other in a rotationally fixed manner. In this case, it would be possible to bring about a rotary motion between chuck 10 and shaft 4. Thus the unit comprising chuck 10 and gluing unit 6 would be conjointly rotatable.

Equally, it is possible to arrange shaft 4 in a torsionally fixed manner and only to provide chuck 10 as rotatable which would then act as a "shaft".

Embodiment 3

Figure 3:
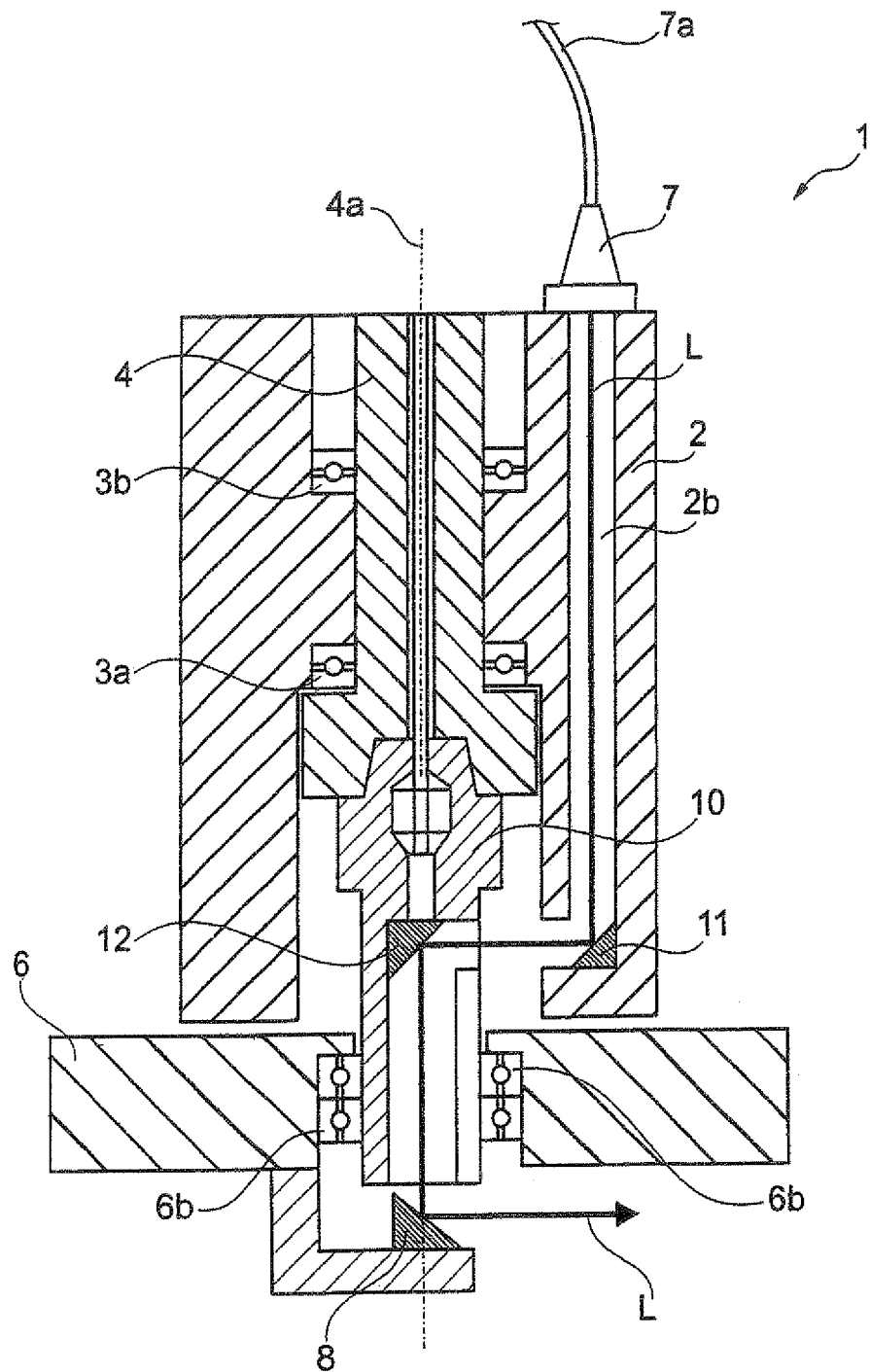
FIG. 3 shows a sectional view of a third preferred embodiment of the present invention.

FIG. 3 illustrates a third embodiment of the present invention which represents a modification of the second embodiment. In this case, laser beam L is not guided along the longitudinal axis of shaft 4 but is launched into chuck 10 in a direction essentially perpendicular to the longitudinal axis and is then transmitted to gluing unit 6.

For this, collimator 7 in this third embodiment is not attached coaxially to the longitudinal axis of shaft 4 but is attached in a different area of the shaft bearing or even in a different area of the processing machine. Laser beam L is launched by collimator 7 into a cavity 2b of shaft bearing section 2 and guided along cavity 2b. In the present embodiment, this cavity 2b runs parallel to longitudinal axis 4a of shaft 4. On attaching a corresponding optic, however, it is also possible to implement a different beam guide inside shaft bearing section 2.

An optic 11 (e.g. a mirror and/or a prism or the like) is provided inside cavity 2b to deflect laser beam L after entering cavity 2b of shaft bearing section 2. This causes laser beam L, as already described, to be guided into chuck 10 in a direction perpendicular to longitudinal axis 4a of shaft 4. A further optic 12 which deflects laser beam L in a direction coaxial or identical to longitudinal axis 4a of shaft 4 is provided in chuck 10.

The embodiment according to FIG. 3 also enables the use of a laser with poorer beam quality due to the larger installation space.

Further Modifications

In the present embodiments, we talk about guiding a laser beam. However, the present invention also includes other types of energy and their transmission. In addition to laser radiation, one should mention, for example, infra-red light or microwave radiation. It is also conceivable to guide a different radiation, for example, thermal energy in the present apparatus.

The present processing apparatus relates to both a processing apparatus with throughfeed capability and also to CNC processing machines. The latter may be equipped in cantilever or gantry design, in particular with a moving gantry. It is also possible to use it in machines with parallel kinematics or in robots etc. In this case, the most varied units can be used although an edge banding unit was described above by way of example.

Thus the unit may also be configured in the form of a focusing device, in particular an optic, usable in the tool holder. By this means, for example, it is possible to carry out processing directly on the workpiece using the radiation supplied by the radiation device.

As already explained, a radiation device (or an energy generation device in general) can be provided for a particular processing apparatus or even for a plurality of processing apparatuses. In the latter case, for example, a distributor would have to be provided which would be operated, for example, via a central control device in order to guide the laser radiation generated by the radiation device to the appropriate processing apparatus.

Furthermore, in addition to the radiation device, other and if necessary different energy sources can also be provided, for example to preheat one or a plurality of the relevant parts to be joined.

Figure 4:
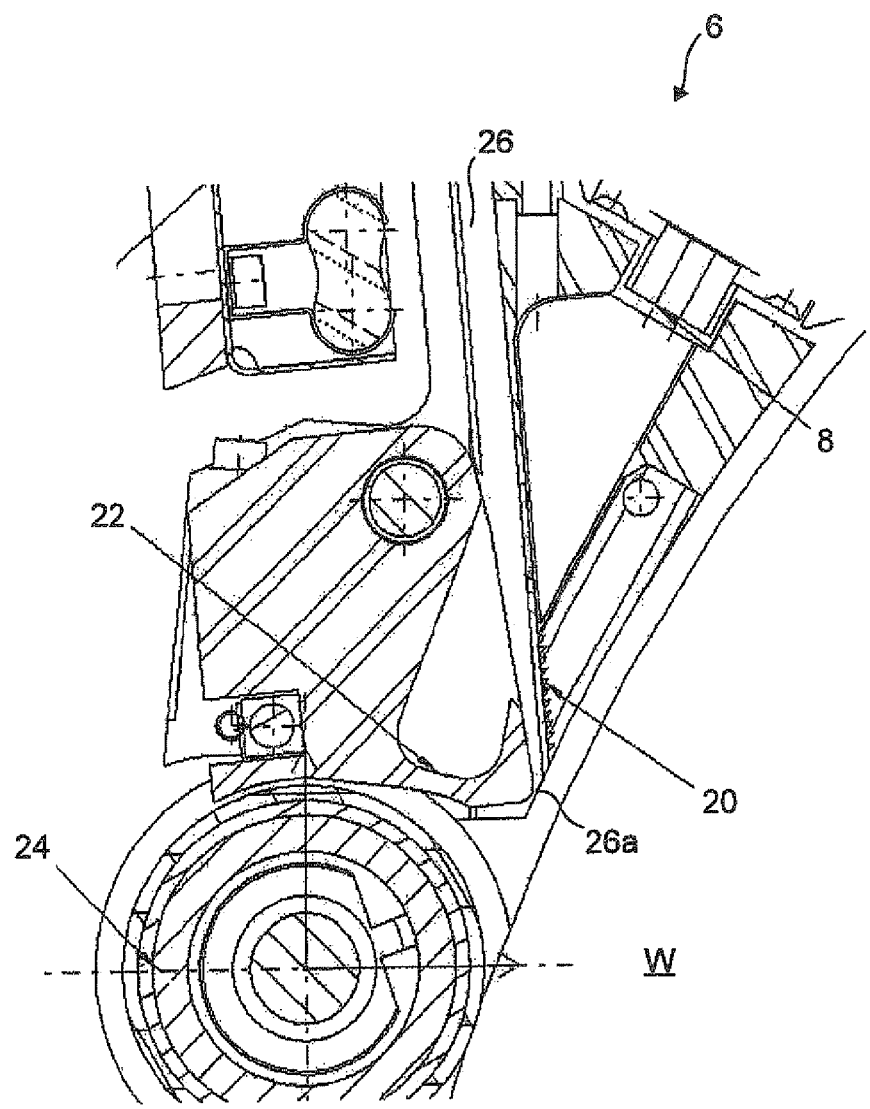
FIG. 4 shows a view from above of a possible variant of the present invention.

A further modification of the present invention, which can be advantageously combined with all the embodiments described above, is illustrated schematically in a view from above in FIG. 4. FIG. 4 shows the development of a fixing unit 6 for the attachment of a coating material to a workpiece W. In this case, the coating material is fed through unit 6 by a supply channel 26 and emerges at an exit aperture 26a, to then be pressed on to workpiece W by means of a pressure roller 24.

In the present embodiment, coating unit 6 has a deflection mirror 8 by means of which supplied radiation (for example laser radiation) can be deflected towards a radiation trap 22 onto the coating material. Thus the radiation in the present embodiment strikes the coating material at an angle deviating from 90° whereby reflection may occur depending on the coating material and the type of radiation.

Against this background, coating unit 6 in the present embodiment has a radiation reflection device which is formed in the present embodiment as profiled surface 20. This surface is arranged and set up in such a way that radiation reflected by the coating material is reflected back onto the coating material. In this case, the profiles are formed in such a way that the radiation striking the profiles cannot escape or can only escape to a limited extent from exit aperture 66a [sic] such that the radiation is kept away from exit aperture 26a.

In addition to the development and arrangement of beam reflection device 20 shown in FIG. 4, a large number of other configurations are also conceivable which are suitable for reflecting radiation reflected by the coating material onto the coating material.

The invention claimed is:

1. Apparatus for processing, in particular coating, a workpiece which consists at least in certain portions of wood, wood-based materials, or plastic, the apparatus comprising:
    a radiation device for generating and/or transmitting radiation;
    a spindle unit with a shaft rotatable in a shaft bearing section and a holder for accommodating processing tools and/or processing units; and
    a fixing unit for attaching a coating material to the workpiece;
    wherein the shaft and/or a unit attached to the shaft has at least in certain portions a cavity and
    the radiation device is arranged in such a manner that the radiation runs at least in certain portions inside the cavity.

2. Apparatus according to claim 1, wherein the cavity ends in the region of the holder for accommodating processing tools and/or processing units or in the unit connected to the shaft.

3. Apparatus according to claim 1, wherein the cavity extends through the whole shaft in an axial direction of the shaft.

4. Apparatus according to claim 1, wherein the cavity extends through a chucking tool extending through the shaft, which chucking tool extends in particular in an axial direction of the shaft and is equipped to accommodate the unit.

5. Apparatus according to claim 1, wherein the spindle unit is traversable in at least one, preferably in three, different directions.

6. Apparatus according to claim 1, wherein at least one radiation unit is joined directly or indirectly to the spindle unit and is preferably traversable therewith.

7. Apparatus according to claim 1, further comprising a first transmission unit for radiation which is equipped to transmit radiation generated by the radiation unit to the cavity of the shaft.

8. Apparatus according to claim 7, wherein the at least one transmission unit has at least one radiation guide which is a reflecting or transmitting optic selected from a the group consisting of fibre-optic cables, mirrors, lenses and prisms.

9. Apparatus according to claim 1, further comprising a second transmission unit for radiation which is equipped to transmit radiation exiting the cavity of the shaft to a processing zone, in particular to the workpiece or a component to be joined to the workpiece.

10. Apparatus according to claim 1, wherein the processing unit can be inserted either into the holder of the shaft or into the unit connected to the shaft and can be removed therefrom.

11. Apparatus according to claim 1, wherein the processing unit is rotatably supported relative to the shaft.

12. Apparatus according to claim 11, in which the shaft, the unit attached to the shaft and/or the processing unit attached to the shaft or unit can be rotatably driven.

13. Apparatus according to claim 1, further comprising a radiation reflection device which is equipped and arranged to reflect radiation reflected by the coating material onto the coating material.

14. Apparatus according to claim 13, wherein the radiation reflection device has a profiled, in particular a rippled surface, whereby the profiles are formed in such a way that the radiation striking the profiles is kept away from an exit aperture for the coating material.

15. Apparatus according to claim 1, wherein the radiation device is a laser beam.

* * * * *